United States Patent [19]

Riemann et al.

[11] Patent Number: 4,949,165
[45] Date of Patent: Aug. 14, 1990

[54] METHOD AND APPARATUS FOR TESTING AND CHECKING THE CRITERIA OF A KEY SIGNAL DECODER FROM A CHROMAKEY MIXER

[75] Inventors: Uwe Riemann, Braunschweig; Gerd Brand, Didderse, both of Fed. Rep. of Germany

[73] Assignee: BTS Broadcast Television Systems GmbH, Darmstadt, Fed. Rep. of Germany

[21] Appl. No.: 154,913

[22] Filed: Feb. 11, 1988

[30] Foreign Application Priority Data

Feb. 12, 1987 [DE] Fed. Rep. of Germany ....... 3704289

[51] Int. Cl.$^5$ ..................... H04N 9/68; H04N 9/74; H04N 17/02
[52] U.S. Cl. ..................................... 358/10; 358/22; 358/28
[58] Field of Search ............... 358/10, 22, 28, 183, 358/27

[56] References Cited

U.S. PATENT DOCUMENTS

| | | | |
|---|---|---|---|
| 3,958,269 | 5/1976 | Davis | 358/10 |
| 4,101,928 | 7/1978 | Sato | 358/10 |
| 4,149,178 | 4/1979 | Estes | 358/10 |
| 4,214,258 | 7/1980 | Van der Valk | 358/10 |
| 4,513,318 | 4/1985 | Wilensky | 358/10 |
| 4,694,344 | 9/1987 | Flora | 358/22 |
| 4,710,800 | 12/1987 | Fearing | 358/22 |

OTHER PUBLICATIONS

Test Methods for Digital HDTV Video Switching, by R. Riemann, The Institution of Electronic and Radio Engineers-Third International Conference on Television Measurements, Publication No. 74, Jun. 20, 1987.

Primary Examiner—Tommy P. Chin
Attorney, Agent, or Firm—Frishauf, Holtz, Goodman & Woodward

[57] ABSTRACT

A test pattern generator provides a test pattern signal timed for insertion in the foreground signal of a chromakey mixer to occupy the area of particular shape in any desired part of a monitor screen. The test pattern signal provides a color scan signal which becomes part of the foreground signal within the test pattern area and which is also supplied to the decoder along with the foreground signal. Decoder responds to the color scan signal in the test pattern by substituting the background signal of the portion of the color scan displayed corresponding to colors to which the decoder responds by switching in the background signal. This enables determination of the exact range of response of the decoder while the mixer is operating also of observance of changing of the setting of the response of the decoder so that it can be more accurately set to the desired color range.

8 Claims, 3 Drawing Sheets

METHOD AND APPARATUS FOR TESTING AND CHECKING THE CRITERIA OF A KEY SIGNAL DECODER FROM A CHROMAKEY MIXER

This invention relates to testing a chromakey mixer for ascertaining or checking the color hue value threshold, at least for a given luminance signal value, at which a chromakey mixer is caused to switch from a foreground signal to a background signal by its key signal decoder.

For a long, time already, the so-called chromakey, method, which is also known as color separation overlay, has been used in video programs for providing an electronic background for a television picture that occupies only a little portion of the picture, for example, in an initial portion of a particular television scene. In that method, the color television signal of a program picture content and a background signal, are mixed in a video signal mixer having a chromakey decoder set to operate in response to a detection of a predetermined color. When background and foreground picture contents are mixed, the foreground scene is located apparently in front of a monochromatic background, for example, a blue background, from the color signal of which a switching signal is derived by the decoder for switching from the background signal content to the foreground picture content and vice-versa. This switching signal is derived in the key signal decoder of the video signal mixer in response to a "switching color" contained in the foreground signal.

During the operation of the video signal mixer, there is normally no possibility to test or check directly the parameter values set in the key signal decoder, such as for example the selection range of the color hues and of the color saturation which will result in detection of a "switching color" by the decoder. This lack of opportunity to check these parameters is a serious matter, because the color of the background surface should not be permitted to appear in the actual scenery and in the clothing of the actors which appear in the foreground picture signal, where otherwise the background scene would then appear instead of foreground scene region as the result of triggering the chromakey process

SUMMARY OF THE INVENTION

It is an object of the present invention to provide a method and an apparatus by which in a simple way the selection range for the characteristics of the key signal can be exactly determined and displayed.

Briefly, a test pattern signal, occupying a predetermined portion of the picture screen and including a color scan signal covering a continuous range of color hues wider than the expected signal switching color range for the chromakey decoder, is generated; pre-inserted in the foreground signal and supplied to the mixer with the foreground signal. The resulting picture with the inserted test pattern in a portion thereof is displayed on a T.V. monitor screen, which portion of the test pattern will have distinct area thereof in which the decoder has operated to substitute the background picture content (usually solid color) for the picture content for the corresponding portion of the test pattern, while the remainder of the test pattern insertion area will show the colors of the scan signal which do not produce response of the decoder. The outline of the distinctly visible switched region forming a boundary for the displayed color scan signal designates the switching criteria of the decoder.

In other words, the method and apparatus of the invention produces an exact pictorial diagram of the color selection range set in the decoder for the key signal to which it responds. The invention has the further advantage that the effect of changes in the response parameters of the decoder when the selection region is modified can be observed in the test pattern displayed on the television monitor. Thus, without impairment of the heretofore available possibilities for evaluating the picture quality, an important additional improvement can often be provided by adjusting the setting the video signal mixer decoder to a desired degree of accuracy. The invention also makes possible a general operation check on the signal decoder, which may made continuously observable while chromakey processing is in use.

The test pattern can conveniently have the form of the conventional color hue hexagon or of a particular sector thereof, for easy evaluation of the boundaries of the switched region without requiring undue special training of the observers.

BRIEF DESCRIPTION OF THE DRAWING

The invention is further described by way of illustrative example with reference to the annexed drawings, in which.

Figure 1:
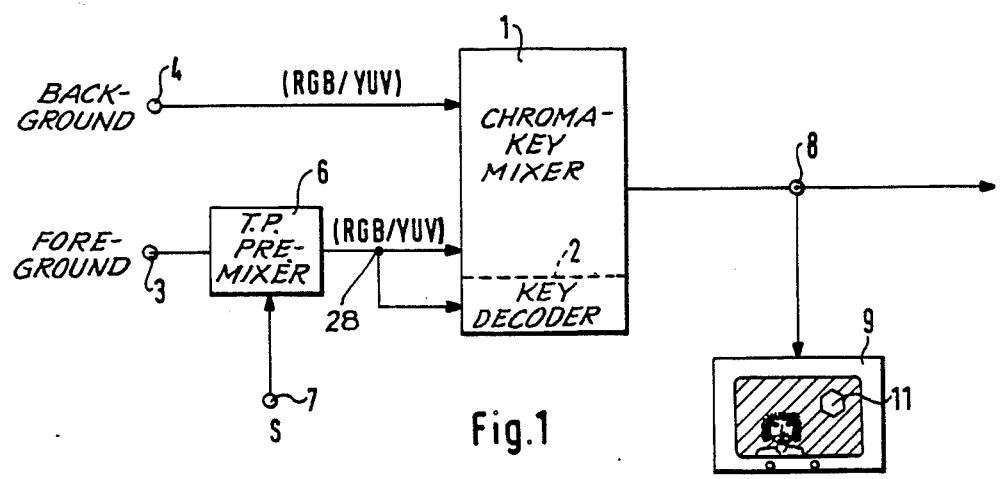
FIG. 1 is a block circuit diagram of apparatus or carrying out test and checking method of the invention.
Figure 2:
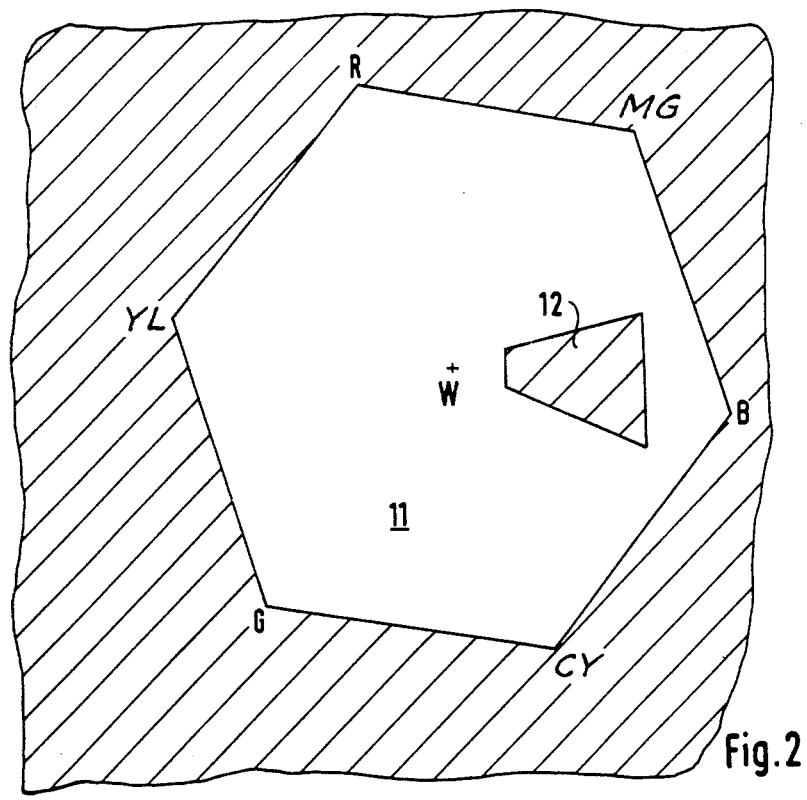
FIG. 2 illustrates a possible test pattern utilizing the conventional color hexagon, within which there appears a switched region, extending for a small distance on each side of the blue color radius.

DESCRIPTION OF THE ILLUSTRATED EMBODIMENTS AND THE METHOD PERFORMED WITH ITS USE:

A foreground picture signal is supplied to a chromakey mixer 1 from the terminal 3, and likewise a background signal from the terminal 4. Foreground and background signals may be supplied either as RGB color value signals or as YUV color television component signals and these signals may be provided either in analog or in digital form.

In the path of the foreground signal between the input terminal 3 and the video signal mixer 1, a test pattern insertion circuit 6 including a test pattern generator is inserted and delivers, over its output connection 28, a predetermined test pattern for testing or checking the decoder 2. A television synchronizing signal S is supplied to the test pattern generator of the test pattern insertion circuit 6 from a terminal 7. The output of the test pattern insertion circuit 6, in addition to being supplied to the decoder, is also supplied along with the foreground signal to the mixer 1. The background signal from the terminal 4 is supplied directly in the usual way to the mixer 1.

The output signal made available at the output 8 of the mixer 1 can be either the foreground signal or the background signal or any desired combination of the two. The nature of the output signal in this regard is dependent upon signals representing a key color for which the decoder 2 is set. A monitor display device 9, connected in circuit for monitoring the output signal at the output 8 of the mixer, displays the output picture containing the test pattern 11 generated by the signal generator of the pattern insertion circuit 6.

The test pattern 11 consists of a color scan surface on which the entire spectrum, for example, of possible colors is fanned out, for example, in a hexagon representing the chrominance plane. In this hexagon, all hues of the colors which can be represented with an RGB color television signal are shown. It is also possible, however, to utilize another geometrical shape of display which, for example, contains only colors which are relevant for determining the color range of detection by the decoder 2.

The generation of the test pattern by the signal generator of the test pattern insertion circuit 6 is not linked to any particular luminance. The hues used in the test pattern 11—including all the combinations of the color difference signals R-Y and B-Y may be represented with any appropriate permissible luminance value on the color scan surface of the test pattern 11. A particularly bright and clearly visible test pattern 11 can be provided on the monitor scope 9 if for every hue of the color scan surface the maximum permissibly available luminance value for that hue is used.

Within the color scan surface of the test pattern 11, a region 12 appears on the screen of the monitor 9 occupied by the background signal by which it is possible to check the operating criteria of the decoder 2. The information content thus provided is that all color hues of the response region set for the decoder 2 are replaced by the background signal. Thus, the shape of the resulting background field within the test pattern is an exact diagram of the color range selected for the setting of the decoder. Furthermore, it is important that the effect of operating decoder parameter changes with change of the critical color range of the decoder can be observed on the monitor scope 9 in the test pattern display. Substantial assistance is thus provided for optimal setting of the video signal mixer decoder without any impairment of any previously existing possibility of evaluation of the resulting picture quality and use of the same monitor. After successfully setting a desired response range for the decoder in accordance with the invention, the insertion of the test pattern can be switched off at the test pattern generator included in the circuit 6.

Figure 3:
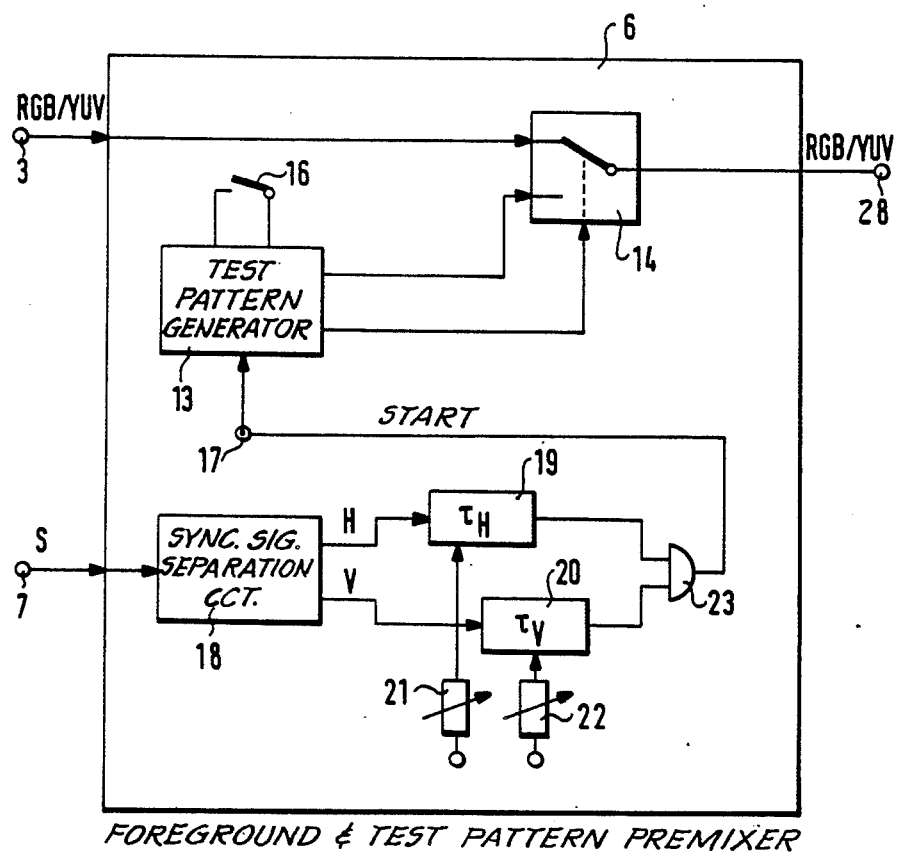
FIG. 3 is a block circuit diagram showing, in more detail, the test pattern signal generator of the apparatus of FIG. 1.

FIG. 3 shows a block circuit diagram of one form of suitable test pattern generator for the circuit 6 of FIG. 1. A foreground picture signal is supplied through the terminal 3 and a synchronizing signal through the terminal 7. The foreground signal as well as the test pattern signal generated by the test pattern signal generator 13 are supplied to an electronic switch 14 which is controlled by a switchover signal also obtained from the signal generator 13. The switch 14 delivers to the output 8 either the foreground picture signal or the test pattern signal. A switch 16 is provided for switching on the signal generator 13 for generating the test pattern 11. If the generation of the test pattern 11 is switched off by the switch 16, the switchover control signal to the electronic switch 14 provides continuous connection of the foreground signal to the output 28.

The test pattern 11 can be represented at any desired location of the picture screen of the monitor scope 9 by a so-called start signal supplied to the input 17 of the signal generator 13 in a well-known way. This start signal is derived from a synchronizing signal S supplied at the terminal 7. The usual synchronizing signals of a television picture signal are first subjected to separation of the horizontal synchronizing signals H from the vertical synchronizing signal V in the circuit 18. The separated horizontal and vertical synchronizing signals are then respectively subjected to delay circuits 19 and 20 which respectively have adjustments 21 and 22 for the shifting of the test pattern respectively horizontally and vertically. The outputs of the delay circuits 19 and 20 are then respectively supplied to an AND gate 23, which furnishes the start signal to the input terminal 17 of the signal generator 13.

Figure 4:
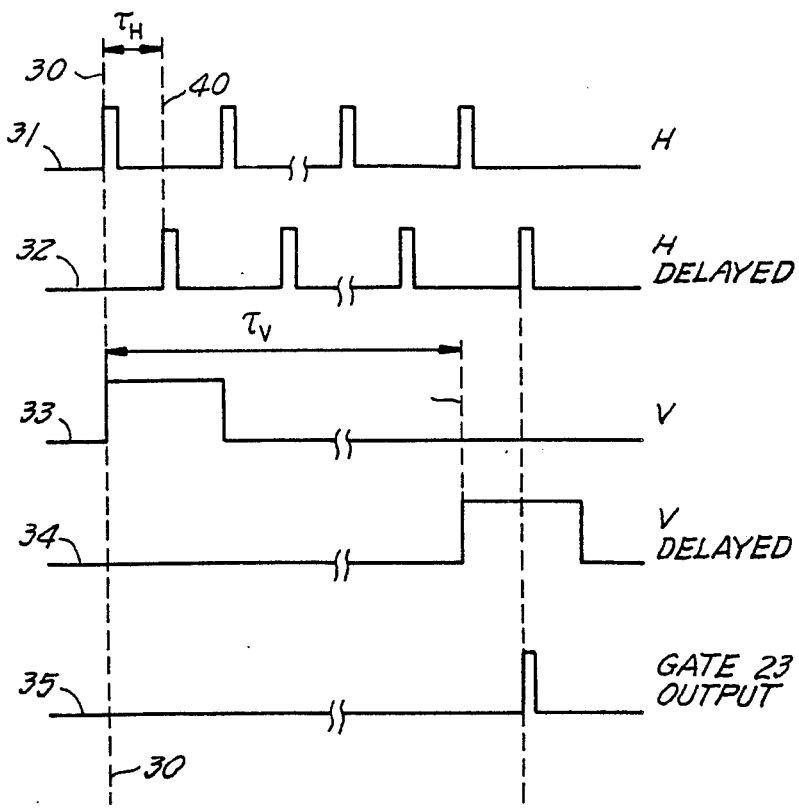
FIG. 4 is a timing diagram showing how the start signal for the signal generator 13 is determined by the operation of the circuits of FIG. 3.

FIG. 4 is a timing diagram showing how the start signal for the signal generator 13 is timed by the circuit of the lower half of FIG. 3. The broken vertical line 30 which intersects all of the horizontal wave diagrams of the figure, respectively designated 31, 32, 33, 34 and 35 designates the moment of beginning of the first line and first field of a television picture, the broken vertical line 40 defines a delay interval $\tau H$ following the instant defined by the line 30, by which the delayed horizontal signal illustrated by the line 32 is delayed relative to the signal $\tau H$ provided by the output of the circuit 18 of FIG. 3 which is graphed on line 31 of FIG. 4. The vertical broken line 41, designates an instant following the instant designated by the line 30 by a delay interval $\tau V$, by which the delayed vertical signal graphed on line 34 of FIG. 4 is delayed with respect to the vertical signal V provided at an output of the circuit 18 of FIG. 3, which is graphed on line 33 of FIG. 4.

Thus the outputs of the delay circuits 19 and 20 of FIG. 3 are respectively shown on lines 32 and 34 of FIG. 4. Line 35, the bottom line of FIG. 4, accordingly illustrates the timing of the output signal of the AND gate 23 of FIG. 3 which provides, at the terminal 17 of FIG. 3, the start signal for the generator 13 of FIG. 3.

Although the invention has been described with reference to a particular illustrative example, it will be understood that modifications and variations are possible within the inventive concept.

We claim:

1. Method of testing the signal switching color criteria of a key signal decoder of a chromakey video signal mixer, comprising the steps of:

generating a color scan signal covering a continuous range of color hue wider than an expected signal switching color range for said key signal decoder, said color scan signal being generated in a form capable of producing a localized test pattern in a display on a television monitor screen;

furnishing to a background signal input of a chromakey video signal mixer a background picture signal and furnishing to a foreground signal input of said chromakey video signal mixer a premixer of a foreground picture signal, having a broad color range excluding a small color range of a predetermined key color except for a portion containing a key signal within said small color range for keying said chromakey video mixer and a localized test pattern producing signal containing said color scan signal;

furnishing to a key signal input of said chromakey decoder said premixture of said foreground picture signal and said test pattern producing signal, and displaying the output of said chromakey mixer on a television monitor screen for observing what part of said localized test pattern is occupied by said background picture signal as a result of operation of said decoder.

2. Method as defined in claim 1, which also includes a step of adjusting the position of said localized test pattern of said television monitor screen by adjusting the timing of a start signal in the step of generating said color scan signal in a form capable of producing said localized test pattern, which start signal is timed relative to television synchronizing signals by the adjustment so made.

3. Method as defined in claim 1, wherein said range of color hue includes all available combinations of color difference component signals (R-Y, B-Y) of a television chrominance signal displayable on said television monitor screen.

4. Method as defined in claim 1, wherein said range of color hue extends over only one continuous part of a range covering all available combinations of color difference component signals (R-Y, B-Y) of television chrominance signals displayable on said television monitor screen.

5. Method as defined in claim 1, wherein said color scan signal associates a predetermined luminance signal value to all of said combinations of the color difference component signals (R-Y, B-Y) of said color scan signals.

6. Method as defined in claim 3, wherein said color scan signal associates a predetermined luminance signal value to all of said combinations of the color difference component signals (R-Y, B-Y) of said color scan signals.

7. Apparatus for testing signal switching color criteria of a key signal decoder of a chromakey video signal mixer comprising, in addition to a said chromakey video signal mixer:

means for supplying a background television signal to a background signal input of said mixer;

means for generating a test pattern signal for producing a localized test pattern that is adjustably locatable in position within the display of said foreground television signal, said generating means including means for provision of a color scan signal in said test pattern signal for a color display in the area of said test pattern encompassing a range of colors including at least all colors to which a key decoder of said mixer is likely to respond;

premixing means including electronic switch means controlled by said test pattern signal for premixing said test pattern signal with a foreground television signal, said foreground signal including in a portion thereof a color key signal and having otherwise no color content in a narrow range of colors encompassing the color of said color key signal, said premixing means having an output connected both to a key signal decoder input and a foreground signal input of said chromakey mixer, and television monitor display means connected to the output of said chromakey video mixer for observing thereby an area within said test pattern inserted in a display of said background television signal wherein a portion of said test pattern replaced by said background television signal designates the response of said key signal decoder.

8. Apparatus as defined in claim 7, comprising also means deriving horizontal and vertical synchronizing signals for said test pattern from synchronizing signals for television display of said foreground and background signals and means for positioning said test pattern within a display of said foreground signal by control of said means for deriving said test pattern synchronizing signals.

* * * * *